(12) United States Patent
Frey, Jr.

(10) Patent No.: US 6,449,731 B1
(45) Date of Patent: Sep. 10, 2002

(54) SELF-HEALING COMPUTER SYSTEM STORAGE

(75) Inventor: Alexander H. Frey, Jr., Wayzatta, MN (US)

(73) Assignee: Tricord Systems, Inc., Plymouth, MN (US)

( * ) Notice: Subject to any disclaimer, the term of this patent is extended or adjusted under 35 U.S.C. 154(b) by 0 days.

(21) Appl. No.: 09/375,909

(22) Filed: Aug. 17, 1999

Related U.S. Application Data (63) Continuation-in-part of application No. 09/261,708, filed on Mar. 3, 1999.

(51) Int. Cl.$^7$ ................................................. H02H 3/05
(52) U.S. Cl. ............................... 714/9; 714/6; 714/770; 707/202
(58) Field of Search ............................... 714/6, 9, 770; 707/202

(56) References Cited

U.S. PATENT DOCUMENTS

| | | |
|---|---|---|
| 4,722,085 A | 1/1988 | Flora et al. |
| 4,761,785 A | 8/1988 | Clark et al. |

(List continued on next page.)

FOREIGN PATENT DOCUMENTS

| | | |
|---|---|---|
| EP | 0 709 779 A2 | 5/1996 |
| WO | WO 97/22054 | 6/1997 |
| WO | WO 99/09479 | 2/1999 |

OTHER PUBLICATIONS

TRANSARC™ Website print–out: The AFS System In Distributed Computing Environment, IBM Transarc, Pittsburgh Pennsylvania, 10 pgs., not dated.

TRANSARC™ Website print–out: The AFS System In Distributed Computing Environments, Transarc Corporation, Pittsburgh, Pennsylvania, 8 pgs., May 1996.

Network Applicance, Inc. Website print–out: The Network Appliance Enterprise Storage Architecture: System and Data Availability, Michael J. Marchi, Andy Watson, Network Appliance, Inc., 11 pgs., Copyright 2000.

Paper: The Architecture of the High Performance Storage System (HPSS), Danny Teaff, Dick Watson, Bob Coyne, 24 pgs., not dated.

Paper: Scalability and Performance in Modern File Systems, Philip Trautman, Jim Mostek, 24 pgs., not dated.

Brochure: Foundation Suite™ VERITAS Volume Manager and VERITAS File System, Veritas Software Corporation, 4 pgs.; Copyright 1999.

(List continued on next page.)

*Primary Examiner*—Robert Beausoleil
*Assistant Examiner*—Gabriel Chu
(74) *Attorney, Agent, or Firm*—Wong, Cabello, Lutsch, Rutherford & Brucculeri, P.C.

(57) ABSTRACT

A method to manage storage of an object in a computer system having a first and a second storage management process (wherein the stored object has a data portion, a metadata portion and a fault tolerance data portion) includes receiving a memory access request from a client process, routing the memory access request to the first storage management process, determining the first storage management process has failed, routing the memory access request to the second storage management process (having access to the fault tolerance data portion), receiving a result from the second storage management process, and returning at least a portion of the result to the client process. The second storage management process may reconstruct at least a portion of the metadata portion, modify the fault tolerance data portion in accordance with the memory access request, and store the modified fault tolerance information.

18 Claims, 11 Drawing Sheets

U.S. PATENT DOCUMENTS

| | | | |
|---|---|---|---|
| 4,817,035 A | | 3/1989 | Timsit |
| 4,941,059 A | * | 7/1990 | Grant ........................ 360/72.1 |
| 5,130,992 A | | 7/1992 | Frey, Jr. et al. |
| 5,274,645 A | * | 12/1993 | Idleman et al. ................ 714/6 |
| 5,390,327 A | | 2/1995 | Lubbers et al. |
| 5,522,031 A | | 5/1996 | Ellis et al. |
| 5,524,204 A | | 6/1996 | Verdoorn, Jr. |
| 5,546,535 A | * | 8/1996 | Stallmo et al. .............. 714/42 |
| 5,574,882 A | | 11/1996 | Menon et al. |
| 5,615,352 A | | 3/1997 | Jacobson et al. |
| 5,623,595 A | | 4/1997 | Bailey |
| 5,768,623 A | * | 6/1998 | Judd et al. ..................... 710/17 |
| 5,790,775 A | * | 8/1998 | Marks et al. .................. 714/7 |
| 5,826,001 A | | 10/1998 | Lubbers et al. |
| 5,848,241 A | * | 12/1998 | Misinai et al. .............. 709/213 |
| 5,870,757 A | * | 2/1999 | Fuller ......................... 707/201 |
| 5,875,456 A | | 2/1999 | Stallmo et al. |
| 5,875,457 A | | 2/1999 | Shilit |
| 5,928,367 A | * | 7/1999 | Nelson et al. .............. 264/478 |
| 5,933,592 A | | 8/1999 | Lubbers et al. |
| 5,933,834 A | | 8/1999 | Aichelen |
| 5,960,446 A | | 9/1999 | Schmuck et al. |
| 5,974,503 A | * | 10/1999 | Venkatesh et al. .......... 711/114 |
| 5,987,621 A | * | 11/1999 | Duso et al. ................. 709/224 |
| 5,999,930 A | | 12/1999 | Wolff |
| 6,000,010 A | | 12/1999 | Legg |
| 6,021,463 A | | 2/2000 | Belser |
| 6,029,168 A | | 2/2000 | Frey |
| 6,032,216 A | | 2/2000 | Schmuck et al. |
| 6,035,373 A | | 3/2000 | Iwata |
| 6,041,423 A | | 3/2000 | Tsukerman |
| 6,058,400 A | | 5/2000 | Slaughter |
| 6,073,218 A | * | 6/2000 | DeKoning et al. ............ 710/20 |
| 6,148,414 A | * | 11/2000 | Brown et al. ................. 714/11 |
| 6,173,291 B1 | * | 1/2001 | Jenevein ..................... 707/200 |

OTHER PUBLICATIONS

The Design of the Postgres Storage System, Michael Stonebreaker, Proceedings of the 23$^{rd}$ VLDB Conference, Brighton, pp. 289–300, 1987.

The Recovery Box: Using Fast Recovery to Provide High Availability in the UNIX Environment, Mary Baker, Mark Sullivan, Proceedings of the Summer 1992 USENIX Technical Conference, San Antonio, Texas; pp. 31–43; Jun. 1992.

Raid Technology: The Storage Solution; an nStor Report, 19 pages, not dated.

Net Engineer; RAID Technology, 5 pages, not dated.

Molina, Joe; The RAB Guide to Non–Stop Data Access, 17 pages, not dated.

* cited by examiner

| DATA | METADATA | LEVEL OF SERVICE |
|---|---|---|
| 1200 — UNPROTECTED | UNPROTECTED | PROXY IOM CAN ONLY JOURNAL THE CHANGE REQUEST. THE JOURNALED ENTRY MAY BE RELAYED TO AND EXECUTED BY THE FAILED IOM WHEN IT RETURNS. |
| 1202 — UNPROTECTED | PROTECTED | PROXY IOM MAY RECONSTRUCT AN OBJECT'S METADATA WHICH MAY THEN BE USED TO RECORD ANY CHANGES TO THE TARGET STORED OBJECT. THE RECORDED CHANGES MAY BE RELAYED TO AND INCORPORATED INTO THE TARGET STORED OBJECT BY THE FAILED IOM WHEN IT RETURNS. |
| 1204 — PROTECTED | UNPROTECTED | PROXY IOM CAN ONLY JOURNAL THE CHANGE REQUEST. THE JOURNALED ENTRY MAY BE RELAYED TO AND EXECUTED BY THE FAILED IOM WHEN IT RETURNS. |
| 1206 — PROTECTED | PROTECTED | PROXY IOM MAY RECONSTRUCT THE TARGET STORED OBJECT'S DATA AND METADATA ALLOWING THE PROXY IOM TO OPERATE TRANSPARENTLY TO REQUESTING CLIENTS (ALBEIT MORE SLOWLY - DUE TO THE TIME REQUIRED FOR DATA/METADATA RECONSTRUCTION). |

FIG. 12

SELF-HEALING COMPUTER SYSTEM STORAGE

RELATED APPLICATIONS

This is a continuation-in-part of application Ser. No. 09/261,708 entitled "Computer System Storage," filed Mar. 3, 1999.

BACKGROUND

The invention relates generally to computer system storage and more particularly to mechanisms (methods and devices) for providing distributed computer system storage having proxy backup/stand-in capability.

It is common for organizations to employ large numbers of computers for tasks such as data storage. Typically, some or all of an organization's computers may be interconnected to form a network whereby two or more computer systems are interconnected so that they are capable of exchanging information. With the adoption of computer network technology came the desire for increased storage capacity. Increased storage capacity, in turn, led to a need to distribute file systems across networked computers. In general, distribution of file systems is done by software applications that keep track of files stored across a network. One goal of distributing file systems is to allow a user/application of one computer (or node) in a computer network to access data or an application stored on another node in the computer network. Another goal of distributing file systems is to make this access transparent with respect to the stored object's physical location.

Figure 1:
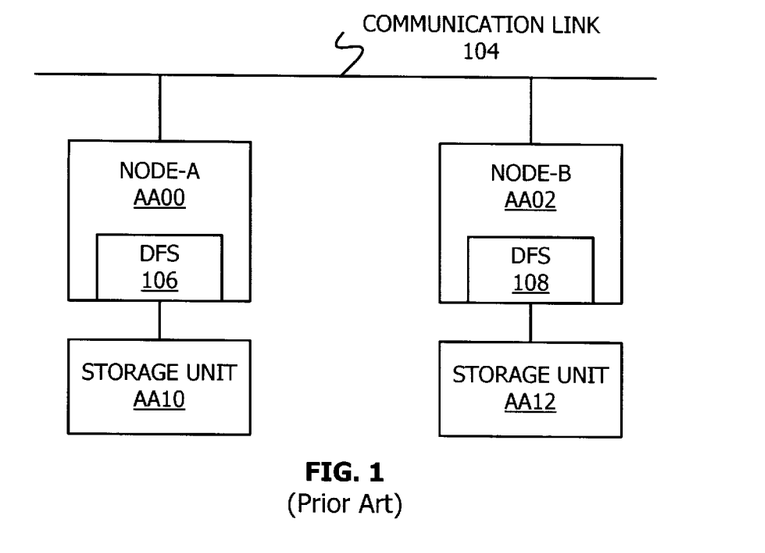
FIG. 1 shows an illustrative computer system employing prior art distributed file system technology.

FIG. 1 shows a computer system employing distributed file system technology in accordance with the prior art. As shown, node-A 100 and node-B 102 are interconnected by communication link 104. Illustrative nodes include specialized or general purpose workstations and personal computers. An illustrative communication link employs coaxial or twisted pair cable and the transport control protocol (TCP). Each node A and B executes a local version of a distributed file system, 106 and 108 respectively. Each distributed file system manages the storage of objects to/from a storage unit (e.g., 110 and 112), each of which may include one or more storage devices. Illustrative storage devices include magnetic disks (fixed, floppy, and removable) and optical media such as CD-ROM disks.

One well known distributed file system is the Network File System (NFS®) from Sun Microsystems, Incorporated of Palo Alto, Calif. In NFS, a server node may make its file system (in part or in whole) shareable through a process known as "exporting." A client node may gain access to an exported file system through a process known as "mounting." Exporting entails specifying those file systems, or parts thereof, that are to be made available to other nodes (typically through NFS map files). Mounting adds exported file systems to the file structure of a client node at a specified location. Together, the processes of exporting and importing define the file system namespace.

Figure 2:
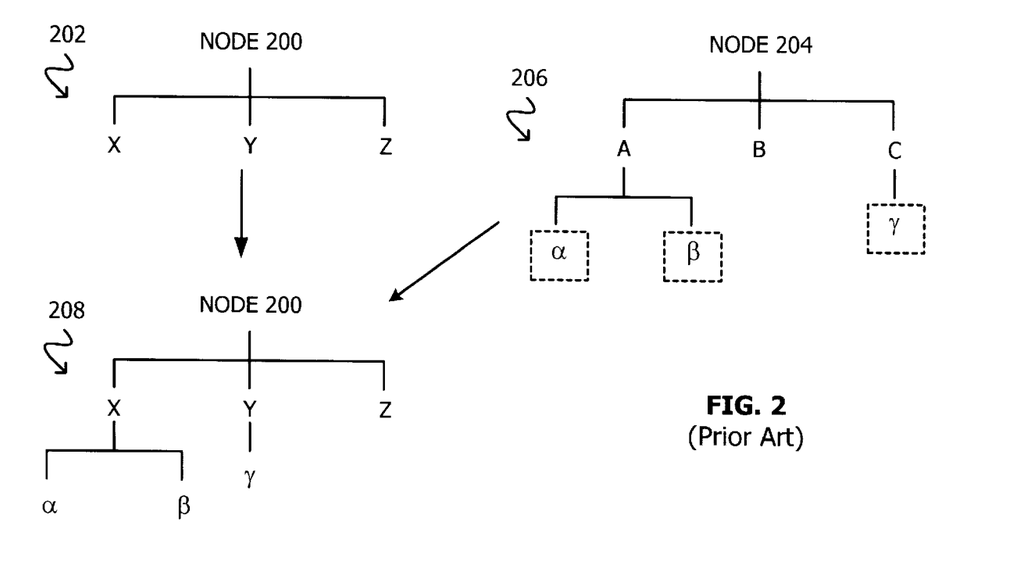
FIG. 2 illustrates how prior art distributed file systems manage shared storage.

For example, consider FIG. 2 in which node 200 has local file system 202 including directories X, Y, and Z, and node 204 has local file system 206 including directories α, β, and γ. If node 204 exports, and node 200 imports file system 206 (often referred to as cross-mounting), node 200 may have combined system namespace 208. From directory structure 208, a user/application on node 200 may access any data object in remote directories α, β, and γ as if α, β, and γ were local directories such as X or Y.

One significant feature of distributed storage such as that illustrated in FIG. 2, is that all references to an object stored in directory α by a user at node 200 (i.e., through combined file system namespace 208) are resolved by the file system local to and executing on node 204. That is, the translation of an object's reference to the physical location of that object is performed by the file system executing on node 204. Another significant feature of current distributed file systems such as NFS® is that the processes of exporting and importing must be performed for each new directory to be shared. Yet another significant feature of current distributed file systems is that shared storage (e.g., mount points α, β, and γ) appear as discrete volumes or nodes in file system namespace. In other words, an exported file system (or part thereof) appears as a discrete objects of storage in the namespace of each importing node. Thus, system namespace is fragmented across multiple storage nodes. To export a single directory from a node to all other nodes in a computer network, not only must the exporting node's map of objects (or its equivalent) be updated to specify the directory being exported, but every node wanting to import that directory must have its map of objects updated. This may happen frequently as, for example, when additional storage is added via a new storage node being attached to the network, and requires significant administrative overhead for each such occurrence.

Thus, it would be beneficial to provide a distributed storage mechanism that reduces administrative overhead associated with sharing memory and unifies the shared system namespace.

SUMMARY

In one embodiment the invention provides a method to manage storage of an object in a computer system having a first and a second storage management process, wherein the stored object includes a data portion, a metadata portion and a fault tolerance data portion. The method includes receiving a memory access request from a client process, routing the memory access request to the first storage management process, determining the first storage management process has failed, routing the memory access request to the second storage management process (the second storage management process having access to the fault tolerance data portion), receiving a result from the second storage management process, and returning at least a potion of the result to the client process. The method may also include reconstructing at least a portion of the metadata portion, identifying the fault tolerance data portion based on the reconstructed portion of the metadata portion, modifying the fault tolerance data portion in accordance with the memory access request, and storing the modified fault tolerance data. Additionally, a record (journal) of the changes made to the fault tolerance data portion may be maintained by the second storage management process and transmitted to the first storage management process when it be comes operational. Methods in accordance with the invention may be stored in any media that is readable and executable by a computer system.

DETAILED DESCRIPTION

Techniques (including methods and devices) to provide computer system storage are described. The following embodiments of the invention are illustrative only and are not to be considered limiting in any respect.

Figure 3:
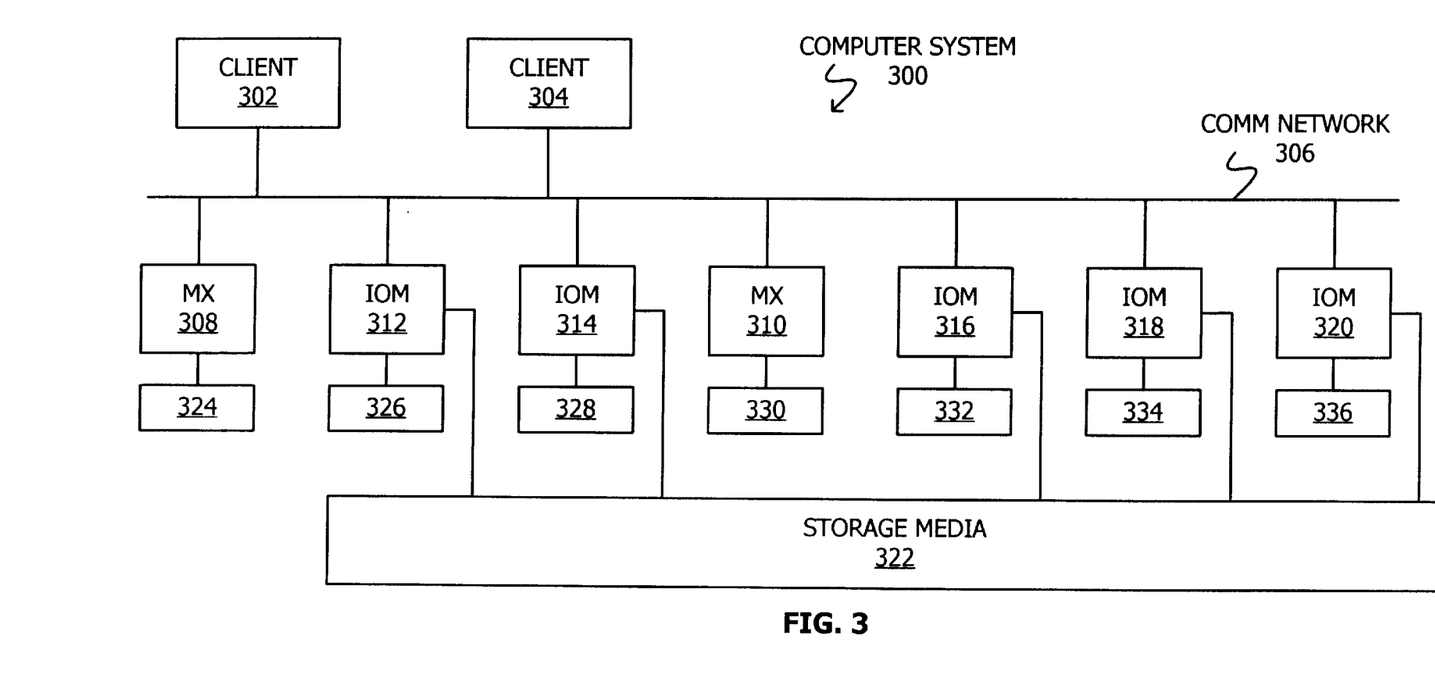
FIG. 3 shows a computer system having distributed system storage in accordance with one embodiment of the invention.

A computer system having distributed storage in accordance with one embodiment of the invention is shown in FIG. 3. As indicated, computer system 300 includes clients 302 and 304, communication network 306, memory translators (MXs) 308 and 310, input-output managers (IOMs) 312, 314, 316, 318, and 320, and storage media 322. In addition, each MX 304 and 306 and each IOM 312 through 320 has an associated data store, 324 through 336.

Clients 302 and 304 generate/initiate memory access transactions such as object creation, object read, object write, and object delete operations. The term "object," as used herein, refers to any entity which may be assigned and accessed by a memory label (e.g., a filename). One illustrative object is a file object which may be defined as of a sequential array of records. Another illustrative object is a directory object which may be defined as of an ordered collection of records. In one embodiment, a directory may be a B-tree of records, the collection of all such records representing a global directory which may be physically stored on one or more storage devices. In one embodiment, a system directory (organized as a single file) is redundantly distributed across multiple storage devices. While the size of a record may be variable, a data file record is typically one byte (i.e., byte addressable) and a directory record is typically the size needed to store that information associated with a directory node (e.g., 1000 bytes). Communication network 306 serves to interconnect the various system components. Illustrative communication networks may use any available protocol (e.g., the transport control protocol) and may be implemented using any suitable technology such as copper wire, infrared, fiber optic, microwave, or satellite communication technologies. Storage media 322 may include one or more storage devices such as, for example, magnetic disks (fixed, floppy, and removable) and optical media such as CD-ROM disks.

Memory translators provide, among other things, two capabilities. First, each MX translates memory access commands between a client protocol, such as that used by an NFS® or Windows NT® based client, and a format that may be processed by one or more input-output managers. In this sense, a MX represents a client's point of access to system memory space embodied in storage media 322. In one embodiment, there may be as many MXs as there are types of client file systems. Second, each MX may obtain and/or retain an object's referential map. A referential map describes the association between an object and those input-output managers at which at least a portion of the object is stored. Thus, input-output managers represent logical storage units over which an object is distributed. (An object's master or primary referential map is maintained as part of the object's directory entry.) In one embodiment, a MX may retain an object's referential map (to the extent possible in data storage 324 or 330, for example) if it performed a lookup operation on the object's label for a client (i.e., a filename to handle translation). In another embodiment, only that MX associated with an input-output manager storing an object's initial portion (e.g., an object's "start of file") retains the object's referential map. The former embodiment may be more efficient when only a single client can access an object at a time. The latter embodiment may be more efficient when more than one client may access an object at once.

In general, referential maps may be generated in accordance with any desired mapping function. In one embodiment, the referential mapping function may rely on the sequential identification of input-output managers in a striping fashion. Referential mapping information of this type may include: (1) identification of that input-output manager at which the object's first record is stored; (2) the number of input-output managers over which the object is distributed, referred to as the object's span; (3) indication of the lowest numbered input-output manager at which any portion of the object is stored; and (4) the quantum (e.g., number of bytes) of the object stored at each input-output manager. In another embodiment, the referential mapping function may be an explicit identification of those input-output managers at which at least a portion of an object is stored. Referential mapping information of this type may include: (1) identification of each input-output manager on which at least a portion of an object is stored; and (2) the quantum of the object stored at each of the identified input-output managers.

Figure 4:
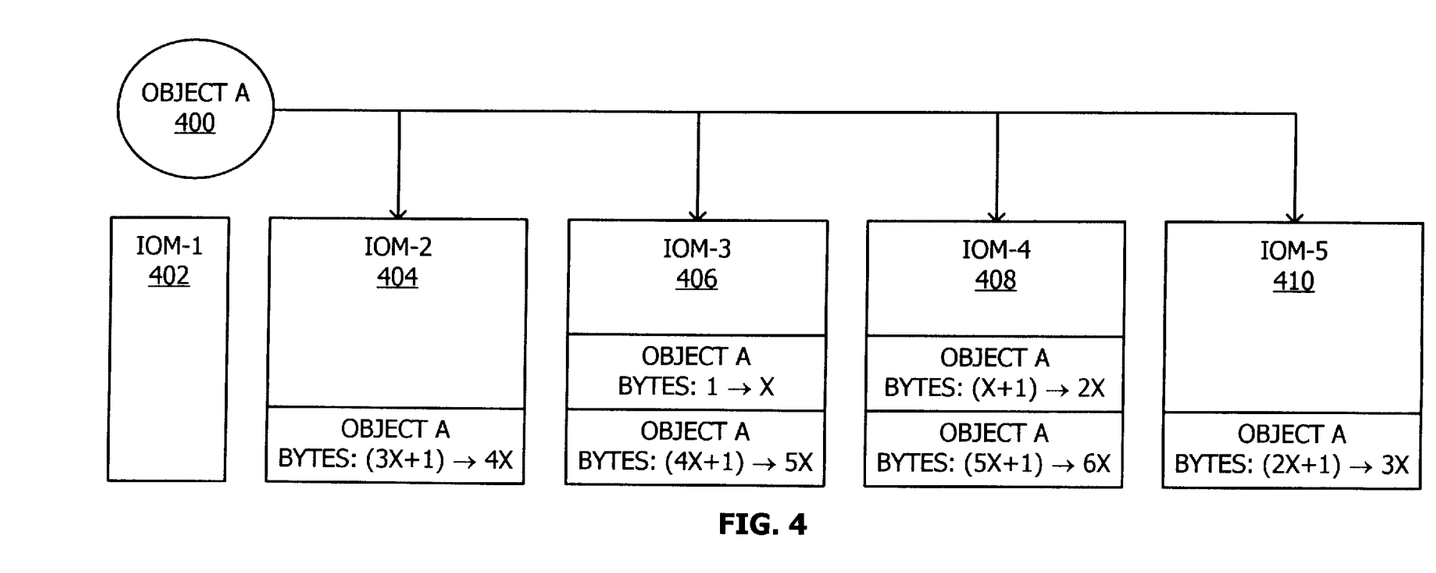
FIG. 4 shows a referential mapping of an object in accordance with one is embodiment of the invention.

FIG. 4 illustrates the first technique in which object A 400 (being 6X bytes in length) is striped across four of a system's five input-output managers (IOM-2 404 through IOM-5 410) in quantum's of X bytes, beginning at IOM-3 404. In this example, object A's starter input-output manager is IOM-2 404; object A's span is 4; the lowest numbered input-output manager at which at least a portion of object A 400 is stored is IOM-2 404; and object A 400 is stored in quanta of X bytes. (Note, object A does not need to be an even multiple of X.)

It is significant to note that referential maps do not incorporate information specifying an object's physical storage location. That is, a MX does not have knowledge of or access to information describing how and where any portion of an object is physically stored. In contrast, prior art distributed file system command protocol translators (e.g., elements 106 and 108 in FIG. 1) generate and maintain mappings between an object's label (e.g., filename), the associated object reference (e.g., handle), and the physical storage locations allocated to the object. Because of this linkage between an object and its physical storage location at the file command translator level, prior art file systems do not distribute an object across a plurality of processors (that is, physical memory managed by two or more processes executing on two or more processors).

Figure 5:
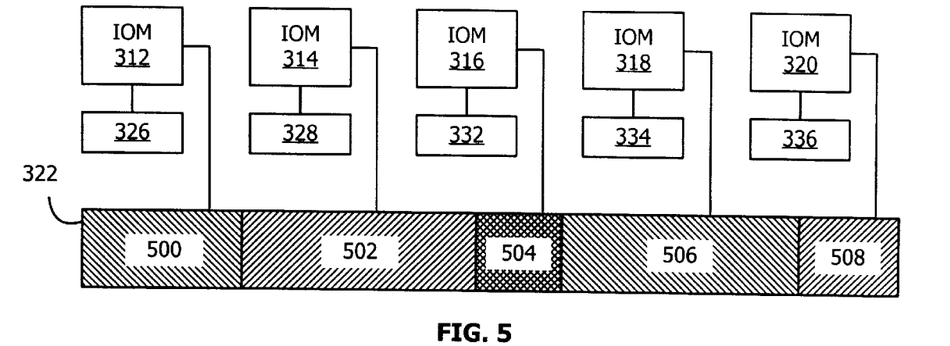
FIG. 5 shows how input-output managers may be mapped to various portions of system storage media in accordance with one embodiment of the invention.

Input-output managers manage a specified portion of system memory embodied in storage media 322. Referring to FIG. 5 for example, IOM 312 may manage memory space 500, IOM 314 may manage memory space 502, and so forth. Each of memory spaces 500 through 508 may span one or more physical storage devices, portions of one or more physical storage devices, or any combination thereof. As additional memory (i.e., storage devices) is added to computer system 300, the new memory may be managed by one or more existing IOMs, one or more additional (new) IOMs, or any combination of new and existing IOMs.

More specifically, IOMs manage the storage of portions of objects to physical memory. To this end, each IOM generates and maintains physical maps. A physical map describes the association between at least a portion of an object managed by an IOM and the physical memory allocated to the those object portions by the IOM. In addition, if an IOM manages the physical storage of only a portion of an object, the IOM may generate and maintain information identifying those IOMs which manage the object's other portions. This latter information may be used by IOMs to facilitate the storage, retrieval, and manipulation of objects distributed across multiple IOMs. It is significant that an IOM generates and maintains physical maps for only those portions of objects for which it manages physical storage.

Partitioning an object's storage access information into independent referential and physical maps in accordance with the invention provides many significant benefits. One benefit is that referential maps may be generated at object creation time and thereafter left unchanged. The unchanging nature of referential maps make them an ideal type of information to globally distribute (e.g., to all clients). Another benefit of separating storage access information into referential maps and physical maps allows the details of an object's physical storage (i.e., its location) to be completely disassociated from the object's addressability via its label or handle. This, in turn, may provide clients with a unified view of system namespace; clients may access an object through a constant and consistent reference without the need (or ability) to know where or how an object is physically stored. Yet another benefit of separate referential and physical maps in accordance with the invention is that each IOM maintains only those physical maps for those portions of objects for which it manages physical memory. Because different IOMs may be associated with—or executed by—different processors, separation of storage access information into referential maps and physical maps provides a mechanism to distribute objects across multiple processors. The ability to distribute objects across multiple processors, in turn, may contribute significantly to the expandability of a distributed storage system in accordance with the invention. Distribution of objects across multiple processors also allows each portion of an object to be accessed independently of any other portion of an object.

Figure 6:
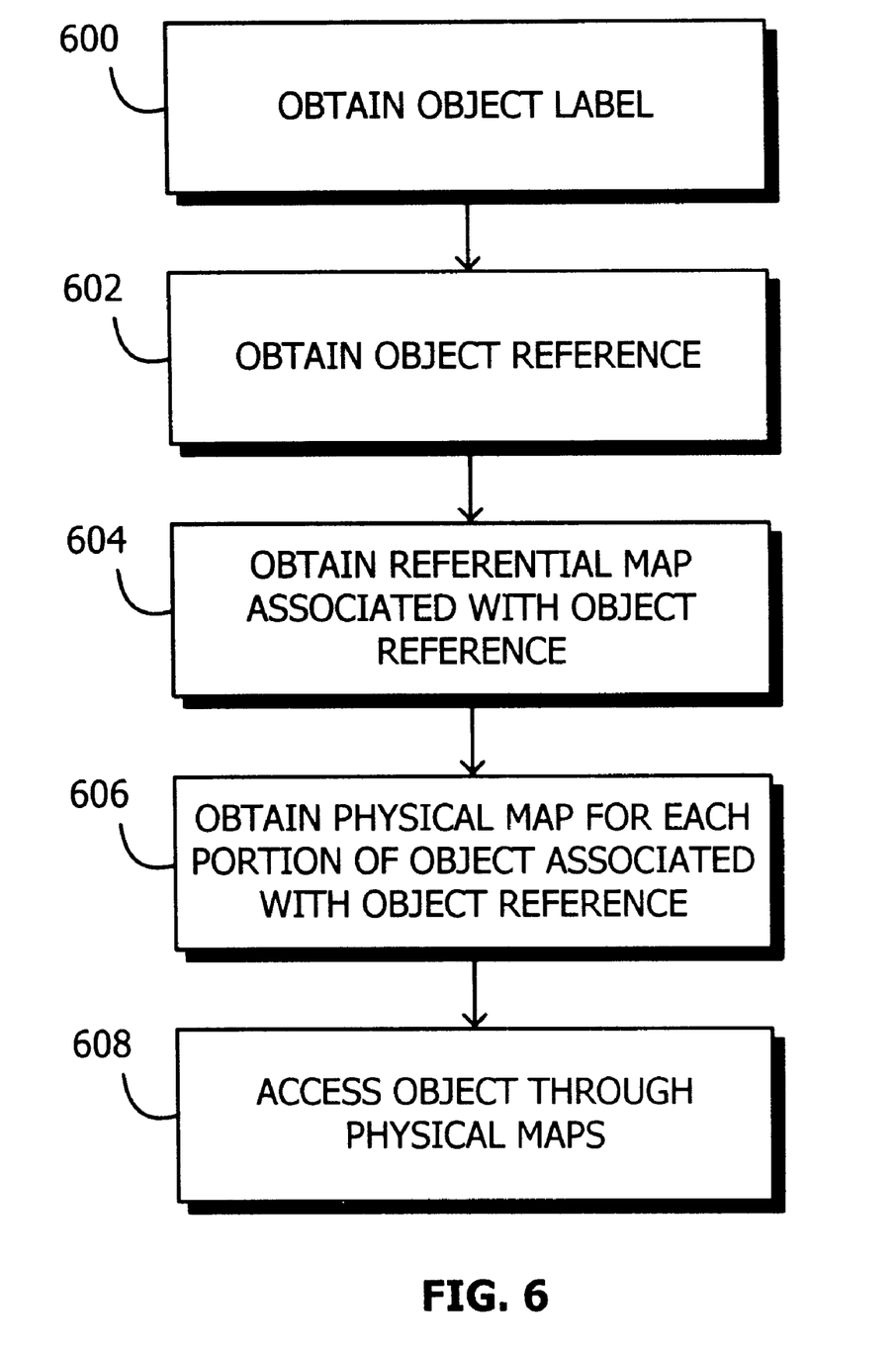
FIG. 6 shows a memory access method in accordance with one embodiment of the invention.

A method to access an object using referential and physical maps in accordance with one embodiment of the invention is illustrated in FIG. 6. Initially an object's label or filename is obtained (block 600) and translated to an object reference or handle in any convenient manner (block 602). (Label to reference translation is often referred to as a "lookup" operation). Having obtained an object's handle, the object's referential map is obtained (block 604). An object's referential map may generally be one element of that object's directory entry so that a directory lookup on an object's handle retrieves that object's referential map. As characterized above, a referential map describes how an object is distributed to one or more IOMs, where each of the one or more IOMs is responsible for managing the physical storage for a part of the object. No information regarding the physical storage characteristics of an object is included in a referential map.

Having identified those IOMs associated with an object, the physical maps for each of the object's distributed portions may be obtained (block 606). Specifically, one or more physical maps may be obtained from each of the IOMs identified in the object's referential map. Access to each portion of an object is then provided by an IOM in accordance with the physical map associated with that IOM (block 608).

It will be recognized that less than an entire object may be accessed. For example, the $n^{th}$ 32 kilobyte block of an object may be accessed by: identifying one or more IOMs responsible for the physical storage of the $n^{th}$ 32 kilobyte block (via the referential map obtained during the acts of block 604); retrieving the relevant physical maps; and accessing physical memory in accordance with those physical maps.

Figure 7A:
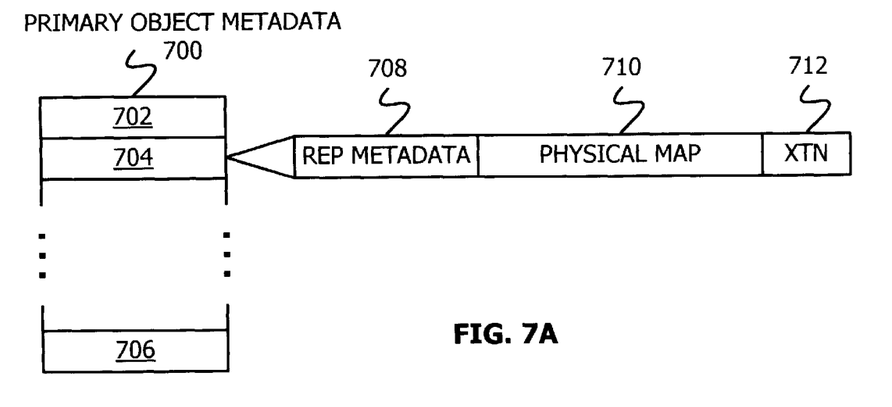
FIGS. 7A, 7B, and 7C illustrate object metadata structures that an input-output manager may use to identify an object's physical map in accordance with one embodiment of the invention.
Figure 7B:
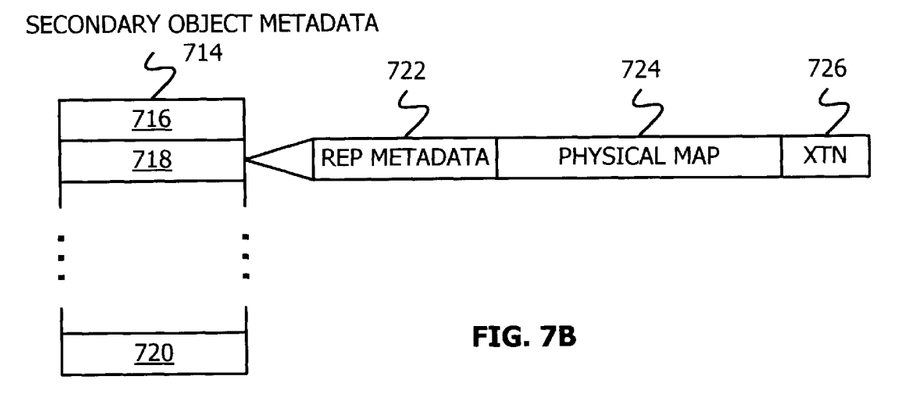

One mechanism by which an IOM may translate an object's reference to a physical map uses a handle that provides an indication of the object's starter IOM and an index into the starter IOM's primary object metadata. An object's starter IOM is that IOM at which the object's initial portion (e.g., an object's "start of file") is stored. For example, if object A is distributed across IOMs 1 through 5, and the first quantum of object A is physically located in memory allocated and controlled/managed by IOM-3, then IOM-3 is said to be object A's starter IOM. An IOM's primary object metadata associates an object's handle with a physical map. An IOM maintains primary object metadata for only those objects (or portions of objects) stored in memory allocated to and managed by the IOM. Each IOM also maintains secondary object metadata for those objects (or portions of objects) stored in memory allocated to and managed by the IOM but for which it is not the starter IOM. Primary and secondary metadata may be retained in data stores associated with each IOM (e.g., component 326 in FIG. 3) which may include volatile and/or non-volatile memory. In one embodiment, each IOM maintains primary and secondary object metadata in table form as shown in FIGS. 7A and 7B.

Each IOM's primary object metadata table 700 includes one entry (e.g., 702, 704, and 706) for each object for which it is the starter IOM. Typically, each entry in primary metadata table 700 is a fixed size, and includes replicated metadata field 708, physical map field 710, and extension field 712. Replicated metadata field 708 includes a copy of an object's referential map information. Physical map field 710 associates each object with one or more physical storage blocks on a storage device. Thus, each physical map may itself include multiple entries. Extension field 712 indicates if an object's physical map exceeds a length allowed by the size of physical map field 710. For example, extension field 712 may be assigned a null or zero value if all of an object's physical storage (managed by an IOM) may be indicated within the space allocated to physical map field 710. If, however, an object's physical map requires more storage block indications than may be included in fixed size physical map entry 710, extension field 712 may indicate a file in which the object's physical map is continued.

Each IOM's secondary object metadata table 714 includes one entry (e.g., 716, 718, and 720) for each object for which it manages physical memory associated with the object (or part thereof) and for which it is not the starter IOM. Each entry in secondary object metadata table 714 includes the same information as does an entry in the primary metadata table 700: replicated metadata field 722; physical map field 724; and extension field 726.

Figure 7C:
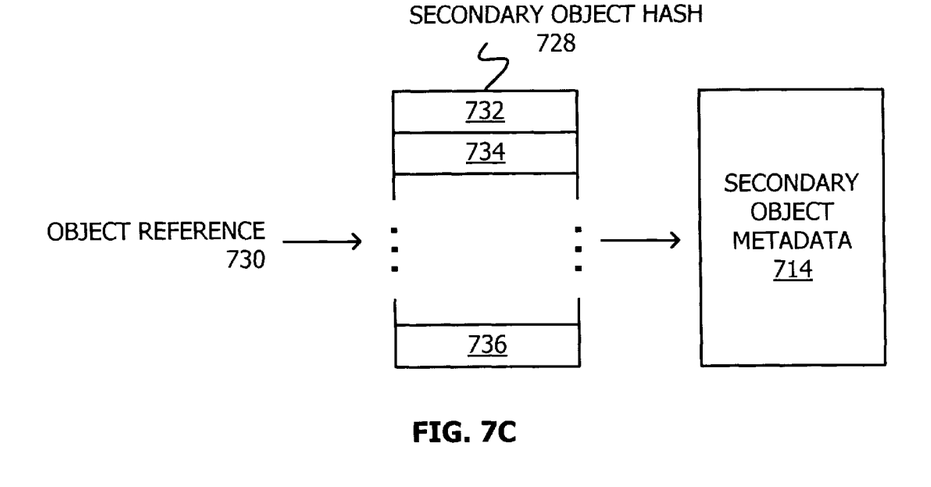

Referring to FIG. 7C, each IOM also maintains a secondary object hash structure 728 to facilitate object reference to secondary object metadata table lookup. As noted above, an object's unique reference or handle provides an indication of the object's starter IOM and index into the starter IOM's primary object metadata 700. Thus, if an IOM is not an object's starter IOM, the object's reference 730 provides no direct indication of where the object's physical map is located. By hashing on object reference 730, a unique entry in secondary object hash structure 728 may be determined (e.g., 732, 734, and 736) which, in turn, identifies a unique entry and physical map in secondary object metadata 714. In one embodiment secondary hash structure 728 may be implemented as a B-tree. In another embodiment, secondary hash structure 728 may be implemented as a link-list structure. In yet another embodiment, secondary hash structure 728 may be implemented as a dynamically resizable array.

Figure 8:
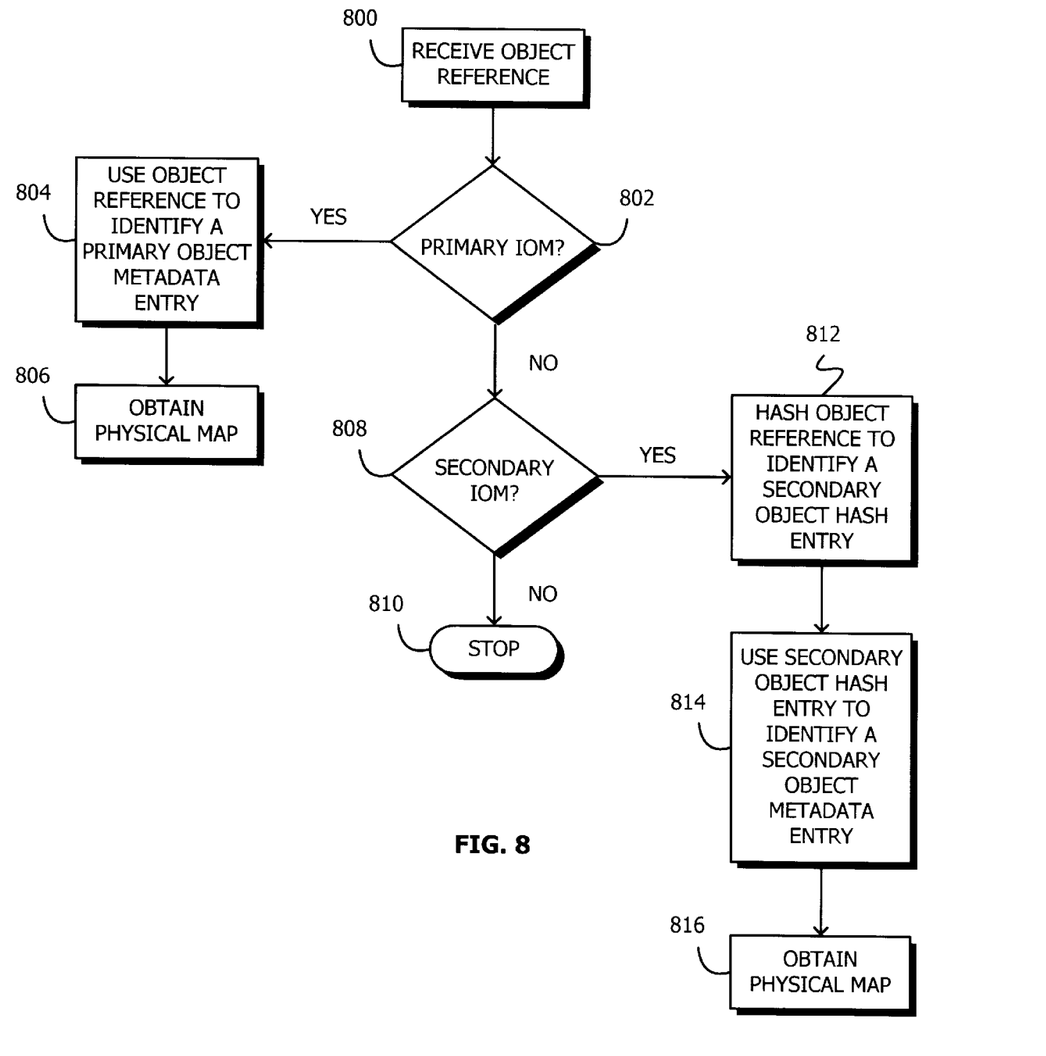
FIG. 8 illustrates a method in accordance with one embodiment of the invention by which an input-output manager identifies a physical map using the metadata structures of FIGS. 7A, 7B and 7C.

A technique in accordance with one embodiment of the invention by which an IOM identifies a physical map using the metadata structures of FIGS. 7A, 7B and 7C is shown in FIG. 8. First, the IOM receives an object reference or handle (block 800). If the IOM is the object's primary IOM (the "yes" prong of diamond 802), the object reference is used to directly identify an entry in the IOM's primary object metadata (block 804). The relevant physical map may then be obtained from the identified metadata entry (block 806). If the IOM is not the object's primary IOM (the "no" prong of diamond 802), and the IOM is not a secondary IOM for the object (the "no" prong of diamond 808), processing may stop as the IOM has no information regarding the object (block 810). If the IOM is a secondary IOM for the object (the "yes" prong of diamond 808), the object reference is hashed to identify a secondary object hash entry (block 812). Based on the identified secondary object hash entry, an entry in the secondary object metadata is identified (block 814). The relevant physical map may then be obtained from the identified metadata entry (block 816).

Figure 9:
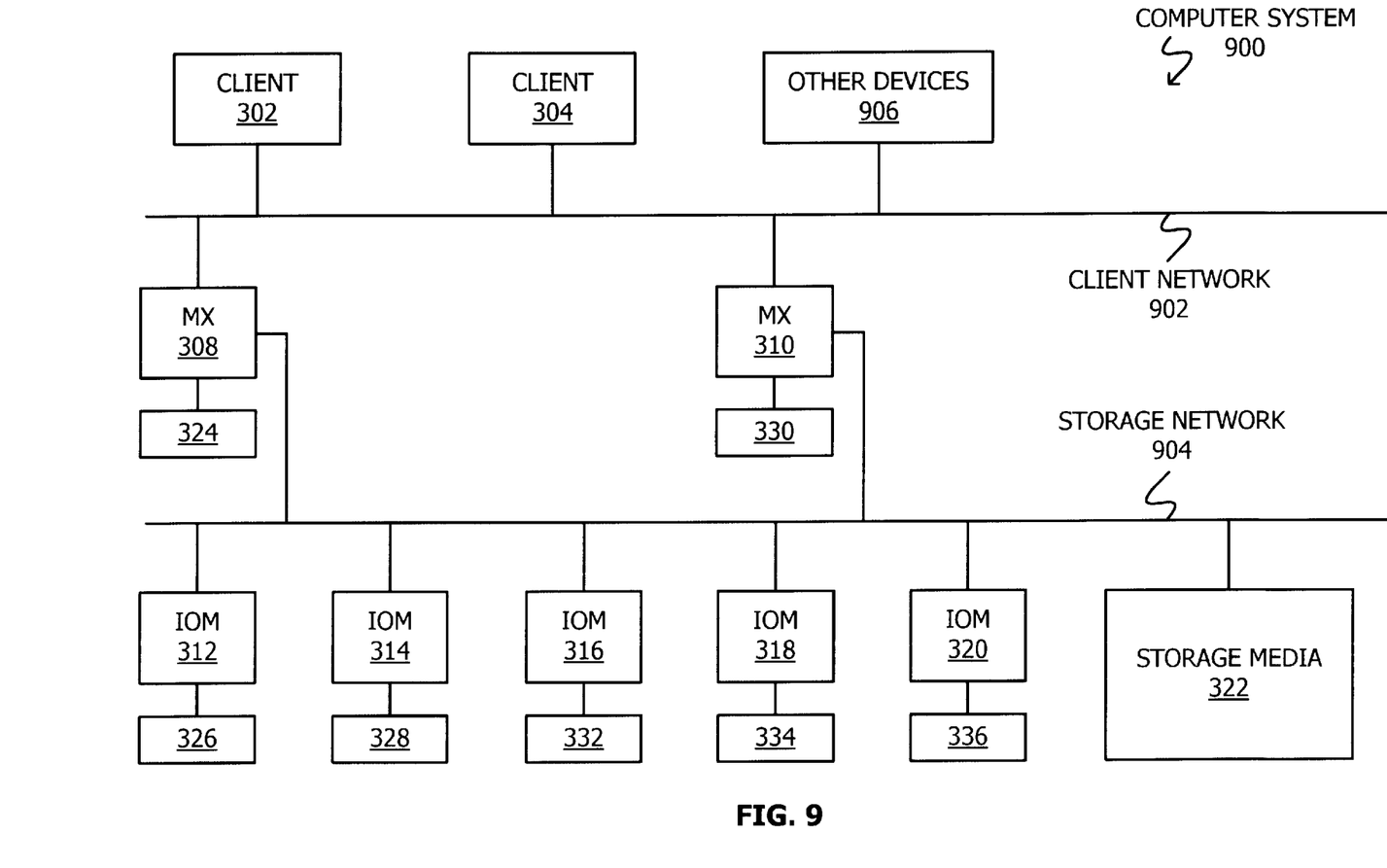
FIG. 9 shows an alternative embodiment for a computer system having distributed system storage.

It will be recognized that a computer system to provide distributed system storage in accordance with the invention may be implemented via architectures different from that shown in FIG. 3. For example, FIG. 9 shows an alternative computer system 900 that employs two networks: client communication network 902 and storage communication network 904. In this embodiment, client data traffic is segregated from storage system data traffic. That is, each client may communicate with another client, a MX, or another device 906 (e.g., a printer device) without interrupting or being interrupted by data transfer operations between one or more IOMs. It will be further recognized that each of client network 902 and storage network 904 may include one or more physical networks and may, furthermore, be implemented using any desired technology. In addition, the implementation of client network 902 and storage network 904 may be independent of one another.

Typically, MX and/or IOMs may be embodied in one or more program modules or routines for execution by a programmable control device. Illustrative programmable control devices include a single computer processor, a plurality of computer processors coupled by one or more communication links, or a custom designed state machine. Custom designed state machines may be embodied in a hardware device such as a printed circuit board comprising discrete logic, integrated circuits, specially designed application specific integrated circuits (ASICs), or field programmable gate arrays.

Figure 10:
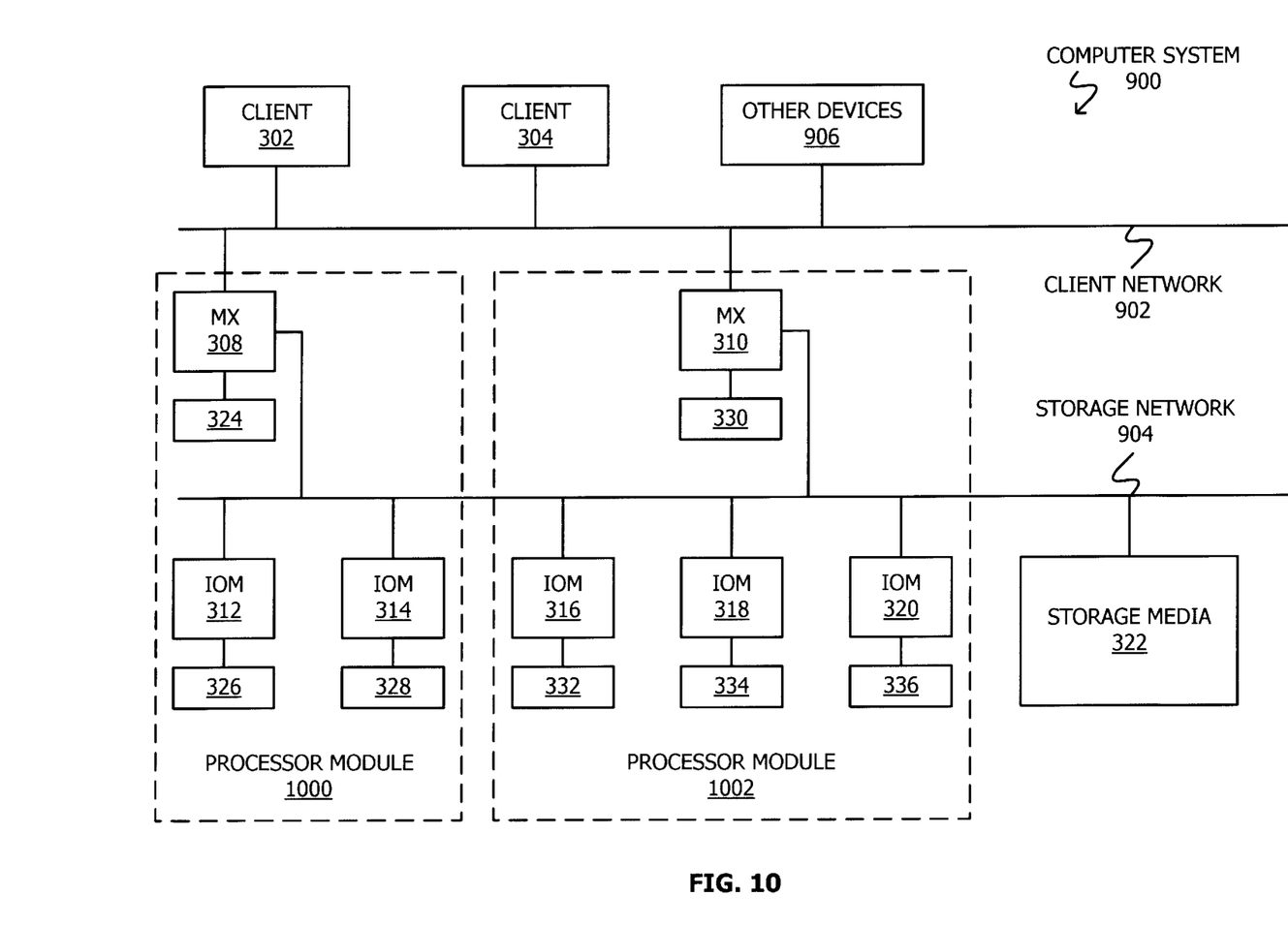
FIG. 10 shows a hardware partitioning of the computer system of FIG. 9 in accordance with one embodiment of the invention.

Referring to FIG. 10, the computer system of FIG. 9 is shown as including processor modules 1000 and 1002 as well as client devices 302, 304, other devices 904, and storage media 322. Each of processor modules 1000 and 1002 includes at least one programmable control device which is designed to execute MX and IOM routines. In a similar manner, each client 302 and 304 may be an independent computer system such as, for example, special or general purpose workstations including multiprocessing systems.

As described herein, MX and IOM objects act independently from and without reliance on resources associated with other MX or IOM objects—they are loosely coupled. Process independence and distributed storage enables a system in accordance with one embodiment of the invention to compensate for a failed MX and/or IOM through the use of proxy objects. For example (see FIG. 3), if IOM 316 is the designated proxy for IOM 312 and IOM 312 fails, IOM 316 may service those client requests directed to failed IOM 312 provided the necessary metadata and fault tolerance data (e.g., parity information) associated with IOM 312's data is available to proxy IOM 316. To facilitate the operational recovery of IOM 312, proxy IOM 316 journals (i.e., records) changes or attempted changes to IOM 312's fault tolerance data. The journaled information may be used by IOM 312 during recovery operations to synchronize its data, that is, to incorporate those changes made by proxy IOM 316. If IOM 312 failed due to a software fault (e.g., an IOM or operating system error), IOM 316 may service IOM 312's requests until IOM 312 is restarted/rebooted. If IOM 312 failed due to a hardware fault (e.g., the processor on which IOM 312 was executing fails), and IOM 312 and 316 are executing on different processors, IOM 316 may service IOM 312's requests until a new processor is provided and IOM 312 is restarted. Thus, distributed computer system storage in accordance with the invention provides storage management software that is self-repairing or self-healing in the face of software and/or hardware failures.

Figure 11:
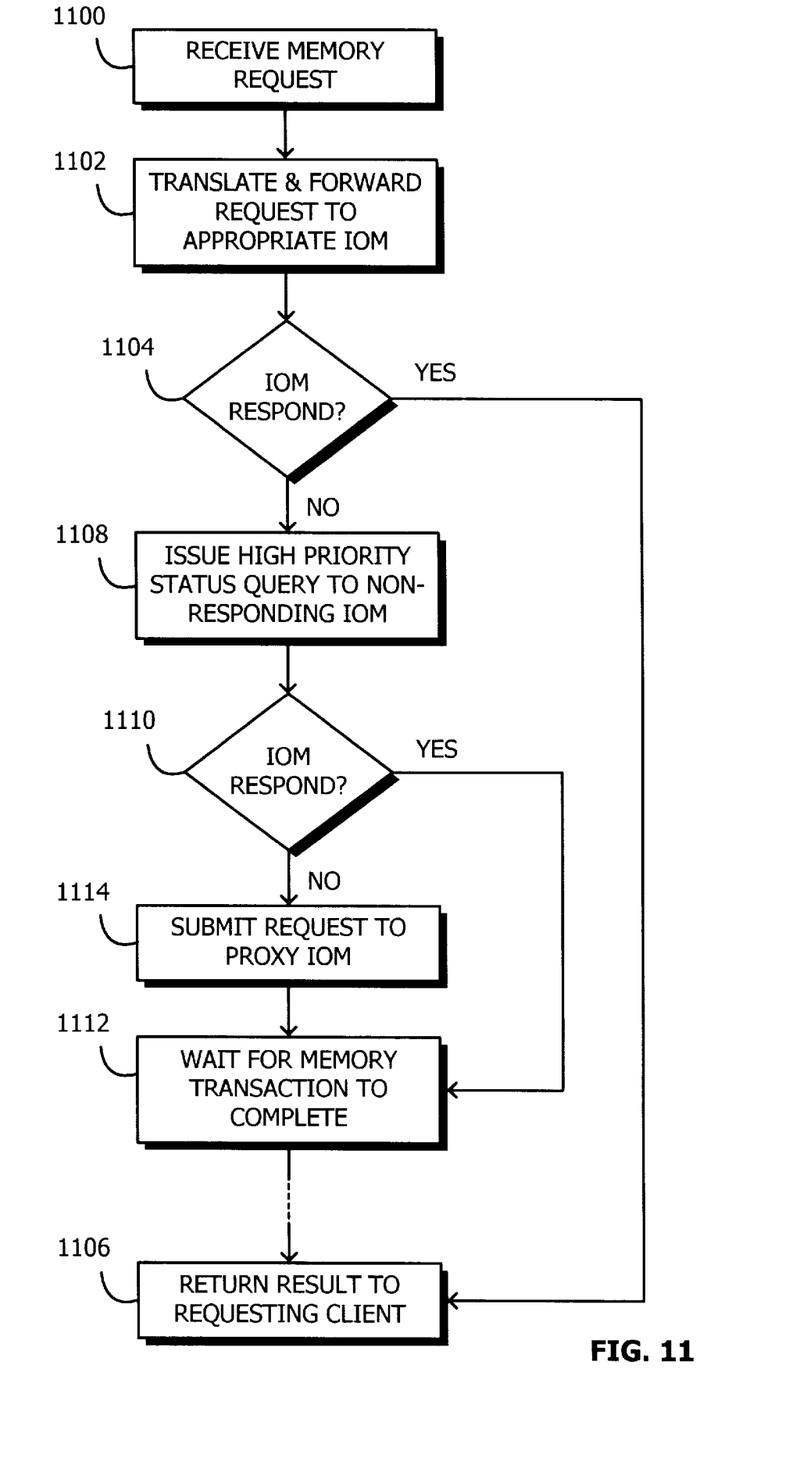
FIG. 11 shows a flowchart of how a memory translator initiates use of a proxy input-output manager in accordance with one embodiment of the invention.

Referring to FIG. 11, a flowchart of how a MX processes a memory transaction request in accordance with one embodiment of the invention is shown. A client-initiated memory transaction request is received (block 1100) and forwarded to the one or more appropriate IOMs as described above (block 1102). If the targeted IOM responds (the "yes" prong of diamond 1104), the response is passed back to the requesting client (block 1106). If the target IOM does not respond within a specified time period (the "no" prong of diamond 1104), the MX may issue a high priority status query (e.g., a "ping" signal) to the non-responding IOM (block 1108). If the IOM responds to this second query (the "yes" prong of diamond 1110), the MX waits for the IOM to complete the memory request (block 1112), forwarding the response to the client when it is received (block 1106).If the targeted IOM fails to respond to the MX's second query within a specified time period (the "no" prong of diamond 1110), the MX assumes the targeted IOM has failed. In another embodiment, the MX may initiate multiple querries to a non-responsive IOM at block 1108 before proceeding with the acts of block 1114. In yet another embodiment, each IOM may issue periodic "heartbeat" signals to indicate to one or more MXs that they are operational; the lack of such a heartbeat signal for a specified period of time indicating the IOM has failed. In general, the combination of acts illustrated by blocks 1104, 1108 and 1110 are designed to distinguish between the case where an IOM is operational but slow to respond, and when it has failed. Thus, if a IOM is operational but slow to respond to a submitted memory access request, a MX may simply wait for the response. If an IOM fails to respond to either the access request or subsequent health status queries within an specified time period (to the access request, to one or more health status requests, or by failure to generate a heartbeat signal, for example), the IOM may be deemed failed. The time period used to distinguish between a slow responding and failed IOM is an operational parameter established by the designer. For example, health status or heartbeat signals may be sent or expected every 100 to 1,000 milliseconds; an IOM failing to respond or transmit the same for a continuous period of 1 to 4 seconds may be deemed to have failed.

Once an IOM is determined to have failed (the "no" prong of diamond 1110), the MX determines which IOM is the appropriate proxy, and submits the memory request to that IOM (block 1114). While many methodologies are possible, in one embodiment proxy IOM assignment relies on the sequential identification of input-output managers. For example, if IOMs 312 through 320 in FIG. 3 are identified as IOMs 1 through 5 respectively, then IOM-1's proxy may be IOM-2, IOM-2's proxy may be IOM-3, IOM-3's proxy may be IOM-4, IOM-4's proxy may be IOM-5, and IOM-5's proxy may be IOM-1. To further improve the ability of proxy IOM's to compensate for run-time failures, IOM identification assignment may alternate, to the extent possible, across processor modules. Referring again to FIG. 10 for example, if IOM 312 is assigned the identifier 1, IOM 314 is temporarily skipped because it executes on the same processor module (module 1000) as does IOM 312. Instead, IOM 316 may be assigned the identifier 2, with the next assignment alternating back to processor module 1000. In this manner IOM 314 may be assigned the identifier 3, IOM 318 the identifier 4, and IOM 320 the identifier 5. Thus, if any one IOM fails (due to a software or hardware failure) there is a proxy IOM that is available to process the failed IOM's requests, provided those requests can be satisfied using metadata and fault tolerance data associated with the failed IOM and available to the proxy IOM (see discussion below regarding FIG. 12).

Following submission of the client's memory request to a proxy IOM (block 1114), the MX waits for the memory transaction to complete (block 1112), forwarding the result to the requesting client when received (block 1106).

As described herein, information related to stored objects has three aspects: data, metadata and fault tolerance data. Data represents the information content of the object, the text and formatting information within a word processing file for instance. Metadata encodes the object's access information such as the level of fault tolerance assigned to the object, storage block use bits, object length or size, time and date modification tags, and the like. Fault tolerance data represents data protection information associated with the data. One example of fault tolerance data is parity information. Some or all of the objects whose physical storage is managed by a specified IOM may have their data and/or metadata protected through a selected fault tolerance scheme. For example, RAID (redundant arrays of independent disks) technology level 1 (disk mirroring), level 3 (parity saved to a dedicated disk), or level 5 (parity data dispersed with object data) may be used to protect a stored object's data and/or metadata. The ability of a proxy IOM to service requests issued to a failed IOM depends, in part, on the level of protection afforded to a stored object's data and metadata. Since a stored object's data and metadata may be protected independently, there are 4 possible levels of service that a proxy IOM may provide.

Figure 12:
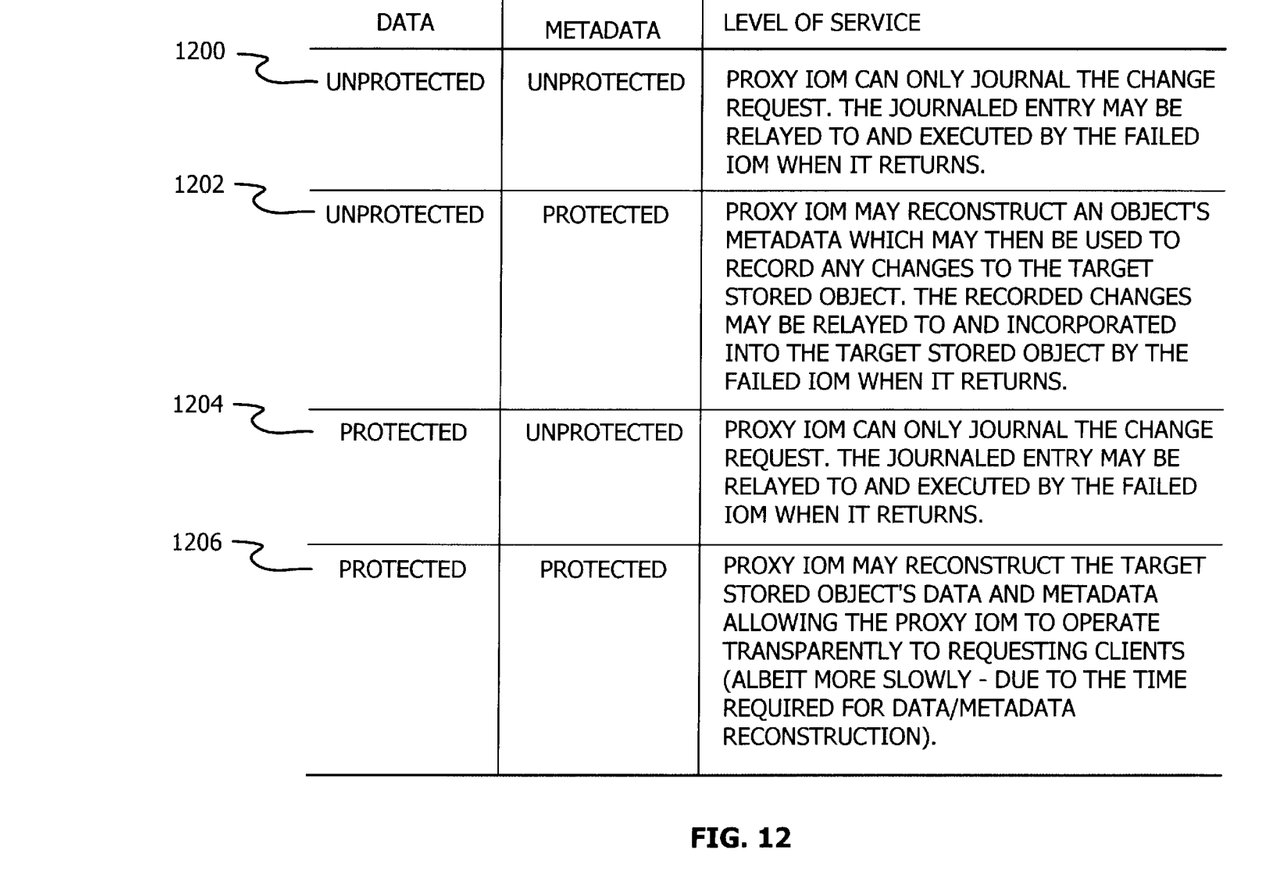
FIG. 12 shows, in table format, 4 possible levels of service a proxy input-output manager process may provide in accordance with one embodiment of the invention.

Referring to FIG. 12, if a stored object's metadata is not protected with, for example, parity information (see entries 1200 and 1204) and the IOM on which the object is stored fails, a proxy IOM has no ability to reconstruct the stored object's metadata (access information) and so, has no way to update the metadata to reflect subsequent changes. In these instances, if the memory access request is a write request, the proxy IOM can journal the requested changes, transmitting the journaled changes to the failed IOM when it is restored. If the memory access request is a read request, the proxy IOM (or MX) indicates a disk fault to the calling process. If the restored IOM is then able to access an object's data and metadata, it may step through the journal and update the modified object in accordance with the journaled change file. It is noted that the ability of a proxy object (e.g., MX or IOM) to journal changes is limited by the storage space available to store the journal data. Once all available space for a journal is consumed, any further updates may be lost when the failed object is restored.

If a stored object's metadata is protected and its data is not (see entry 1202), the proxy IOM may reconstruct the stored object's metadata and, as a result, journal the changes made to the object while also incorporating these changes directly into the fault tolerance data of the stored object's metadata. Again, the journal of changes to the stored object's data may be transmitted to the failed IOM when it is restored so that it can modify the stored object's data if necessary. (Recall, in a distributed storage system some of the stored object's data may not reside on the failed IOM. In these cases, that portion of the stored object's data would not be accessed through the failed IOM.)

If a stored object's data and metadata is protected (see entry 1206), the proxy IOM may stand-in completely for the failed IOM—updating the fault tolerance data of both the stored object's data and metadata. In this case, recovery of the failed IOM may be accelerated by journalling the identity of those pieces of data and metadata that have beed modified. The journal may then be used to limit recovery to only those portions of storage (associated with the recovered IOM) that have been modified. (It will be recognized that the proxy IOM may not be able to offer the response speed of the failed IOM because it must regenerate both the data and metadata being accessed.)

It will be recognized that many software errors (bugs) are triggered by the confluence of a number of actions, the totality of which create an error state that cannot be predicted a priori. That is, many software bugs are intermittant—applications/processes fail under unusual and unpredictable circumstances. A computer storage system in accordance with the invention may compensate for these intermittent and unforeseen errors while also providing a mechanism to troubleshoot (debug) the events leading to the error condition. For example, a IOM process that fails may (before it terminates and its assigned proxy IOM assumes its operations) perform a "core dump" to a protected file (e.g., a parity protected file) so that the error state may be analyzed at a later time.

Another benefit of a storage system in accordance with the invention is that if an IOM's failure is not due to a disk failure even the unprotected data (i.e., filed not parity protected) managed by the failed IOM may be recovered when the failed IOM is restarted (rebooted). Yet another benefit of a storage system in accordance with the invention is that because a proxy IOM can journal changes to files not parity protected it may be possible for the reconstituted (rebooted) IOM to incorporate changes to files even if when the file's metadata and/or data is not parity protected.

It will be recognized by those of ordinary skill in the art of computer file system design, that the use of proxies can be applied equally to memory translator (MX) processes. For example, each MX process (e.g., 308 and 310 in FIGS. 3, 9 and 10) may have a designated proxy MX. In one embodiment, each MX process may be assigned a numeric label on creation (similar to an IOM), wherein the next consecutive MX is a designated proxy. In another embodiment, a MX process may signal a designated MX that it is sending a file system command to one or more IOM's. On completion of the memory transaction the initiating MX could send a "transaction complete" message to its proxy MX. If at any time a MX that initiates a memory transaction fails to send a "transaction complete" message to its proxy MX within a specified time period, the proxy MX may assume the originating MX has failed and follow the procedure outlined in FIG. 11.

Various changes in the materials, components, circuit elements, as well as in the details of the illustrated operational methods are possible without departing from the scope of the claims. For instance, the illustrative computer systems of FIGS. 3, 9 and 10 may be physically embodied in a single unit or distributed to two or more units. Each unit may include one or more programmable control devices such as microcontrollers or processors. In addition, acts in accordance with FIGS. 6, 8, and 11 may be performed by one or more programmable control devices executing instructions organized into program modules. Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to manage storage of an object in a computer system having a first and a second storage management process, the stored object including a data portion, a metadata portion and a fault tolerance data portion, the method comprising:
   receiving a memory access request from a client process;
   routing the memory access request to the first storage management process;
   determining the first storage management process has failed;
   routing the memory access request to the second storage management process, wherein the second storage management process
      reconstructs at least a portion of the metadata portion,
      identifies the fault tolerance data portion based on the reconstructed portion of the metadata portion, and
      modifies the fault tolerance data portion in accordance with the memory access request;
   receiving a result from the second storage management process; and
   returning at least a portion of the result to the client process.

2. The method of claim 1, wherein the first and the second storage management processes comprise input-output management processes.

3. The method of claim 1, wherein the act of determining the first storage management process has failed comprises:
   transmitting at least one health status query signal to the first storage management process after a first specified time period; and
   determining the first storage management process has failed if it fails to reply to at least one of the at least one health status queries within a second specified time period.

4. The method of claim 3, wherein the first specified time period is between approximately 10 and 1,000 milliseconds and the second specified time period is between approximately 1,000 and 4,000 milliseconds.

5. The method of claim 1, wherein the act of determining the first storage management process has failed comprises failing to receive a heartbeat signal from the first storage management process within a specified time period.

6. The method of claim 5, wherein the specified time period is between approximately 1,000 and 4,000 milliseconds.

7. The method of claim 1, wherein the act of routing the memory access request to the second storage management process further causes the second storage management process to store an indication of the modified fault tolerance data.

8. The method of claim 7, wherein the method to manage storage of an object further comprises routing the stored indication of the modified fault tolerance data to the first storage management process when it is restored to operation.

9. The method of claim 1, wherein the fault tolerance data portion comprises parity information.

10. A method to process a memory access request by a storage management process, the memory access request directed to a stored object having a data portion, a metadata portion and a fault tolerance data portion, the method comprising:
    reconstructing at least a portion of the metadata portion;
    identifying the fault tolerance data portion based on the reconstructed portion of the metadata portion;
    modifying at least a portion of the fault tolerance data portion in accordance with the memory access request; and
    storing the modified fault tolerance data.

11. The method of claim 10, further comprising storing an indication of the modifications to the fault tolerance data portion.

12. The method of claim 11, further comprising forwarding the stored indication of modifications to the fault tolerance data portion to a second storage management process.

13. The method of claim 10, wherein the fault tolerant data portion comprises parity information.

14. A program storage device, readable by a programmable control device, comprising:
    instructions stored on the program storage device to perform a memory access operation on a stored object, the stored object having a data portion, a metadata portion and a fault tolerance data portion, the instructions causing the programmable control device to
    reconstruct at least a portion of the metadata portion;
    identify the fault tolerance data portion based on the reconstructed portion of the metadata portion;

modify the at least a portion of the fault tolerance data portion in accordance with the memory access operation; and store the modified fault tolerance data.

15. The program storage device of claim 14, further comprising instructions to cause the programmable control device to store an indication of the modified fault tolerance data portion.

16. The program storage device of claim 15, further comprising instructions to cause the programmable control device to route the stored indication of the modified fault tolerance data portion to a second programmable control device.

17. The program storage device of claim 14, wherein the programmable control device comprises a storage device controller.

18. The program storage device of claim 14, wherein the storage device controller comprises a magnetic disk controller.

* * * * *